United States Patent [19]

Gammarino et al.

[11] 4,086,711
[45] May 2, 1978

[54] LASER HIT INDICATOR USING REFLECTIVE MATERIALS

[75] Inventors: Rudolph Ronald Gammarino, Hacienda Heights, Calif.; John James Theologos, Ft. Eustis, Va.

[73] Assignee: The United States of America as represented by the Secretary of the Army, Washington, D.C.

[21] Appl. No.: 768,115

[22] Filed: Feb. 14, 1977

[51] Int. Cl.² .......................... F41J 5/02; G09B 9/00
[52] U.S. Cl. ....................................... 35/25; 273/101.1
[58] Field of Search ................ 35/25; 89/41 L; 273/101.1, 101.2, 102.2 B; 356/152, 154

[56] References Cited

U.S. PATENT DOCUMENTS

| | | | |
|---|---|---|---|
| 3,220,732 | 11/1965 | Pincus | 273/101.1 |
| 3,508,751 | 4/1970 | Meyer et al. | 273/101.1 |
| 3,888,022 | 6/1975 | Pardes et al. | 35/25 |
| 3,898,747 | 8/1975 | Marshall | 35/25 |
| 3,914,879 | 10/1975 | Taylor et al. | 35/25 |
| 3,950,862 | 4/1976 | Schiel et al. | 35/25 |
| 3,964,178 | 6/1976 | Marshall et al. | 273/101.1 |
| 3,995,376 | 12/1976 | Kimble et al. | 35/25 |

*Primary Examiner*—Richard C. Pinkham
*Assistant Examiner*—Vance Y. Hum
*Attorney, Agent, or Firm*—Nathan Edelberg; Edward Goldberg; Jeremiah G. Murray

[57] ABSTRACT pg,1 Marksmanship training devices are provided in which a laser emitter is mounted on a firearm or other weapon at the firing point and in which a reflective target is placed over a desired area on the ultimate target and object and a solar cell type detector is mounted in relatively close proximity to the target to determine if and when a laser emission from the firearm or weapon has impinged upon the target and generate a hit indication of the audible and/or visible type.

4 Claims, 5 Drawing Figures

LASER HIT INDICATOR USING REFLECTIVE MATERIALS

RIGHTS OF THE GOVERNMENT

The invention described herein may be manufactured and used by or for the Government for governmental purposes without the payment of any royalties thereon or therefor.

FIELD OF THE INVENTION

This invention relates to marksmanship training devices and more particularly to marksmanship training devices using a laser emitter at the firing point and a reflective target and detector at the aiming point to provide efficient hit indication at the target means.

BACKGROUND OF THE INVENTION

In training military and other personnel in weapons gunnery and marksmanship, it has been attempted in the past to utilize laser emissions instead of live ammunition at the firing point and a form of detection of laser impingement at the target or aiming point together with some audible or visible indication that a hit has been made on the target or aiming point.

One such method which has been suggested and utilized is to place an array of, for example, up to a dozen solar cells together with transformers and detectors and other electronic amplifying equipment directly to the target such that when the target is impinged by the laser beam from the firing point, at least one of the detectors will detect its presence and generate an alarm of some sort through the solar cell pick-up and electronic amplifier equipment to activate a hit indicator.

Another system which has been suggested and utilized in the past is to construct a portion of the target from retroreflective means which would reflect the impinged laser beam constituting a hit on the target all the way back to the firing point where a detector is located and that detector would pick up the retroreflected beam and provide an audible and/or visible indication that a hit had been achieved.

Both of these systems are cumbersome, limited in range and accuracy, and expensive. Furthermore, the particular array of solar cells used or the construction of a suitable retroreflector severely limit the nature and extent of the shape and location of the various target areas which may provide a less than desirable training program for certain types of targets.

In short, the versatility of the prior art systems is severely limited.

It is therefore an object of the invention to provide a new and novel laser type marksmanship and weapons gunnery training system which is more versatile than prior art systems.

It is another object of the present invention to provide a new and novel marksmanship and weapons gunnery system utilizing laser emissions and reflective target devices which have an extended range.

Still another object of the present invention is to provide a new and novel marksmanship and weapons gunnery system utilizing laser emissions and reflective target means including detector amplifier and hit indicator means located in close proximity to the target means.

These and other objects of the present invention will become more fully apparent with reference to the following specification and drawings which relate to a preferred embodiment of the present invention.

SUMMARY OF THE INVENTION

A laser emitter device is mounted on a weapon or firearm which is bore-sighted such that normal aiming of the firearm or weapon, if correctly done, will cause the emitted laser energy from the laser device to impinge upon a given target area at which the weapon or firearm has been aimed.

On the target, either the entire target will be covered with a light scattering reflective material such as the well known reflective tape and the like in a full coverage mode or in a particular kill point configuration which is a preferred hit area on a generally larger target device.

At a relatively short distance from the reflecting material on the target device such as, for example, 1 to 2 meters away, are mounted a solar cell amplifier and a threshold means which detect the reflection of laser energy from the reflective matter on the target and subsequently energize an audible or visible hit indicator or alarm device.

At the receiver the detector can be masked so as to cut out all background except the target or portion of the target. This mode of operation requires the use of a lens and mask placed in front of the photodetector. To generate the mask a photograph (black and white) is taken of the target or portion of the target using the lens or equivalent lens to be used in the optical receiver. The negative gotten from the photograph then becomes the desired mask. This technique of masking the optical receiver greatly reduces the possibility of getting false alarm for sources other than the target.

For large moving targets, the detector unit can be on the target and the hit indicator can be, for example, a smoke bomb, strobe flash or other highly visible and if desired, relatively spectacular form of audible and/or visible hit indicator means.

When the weapon or firearm bearing the bore-sighted laser device is actuated such as by pulling the trigger, one or more laser pulses are emitted in the direction of the target. If the weapons' sights are properly aligned on the target, the laser pulses will strike the active reflective area of the target and be reflected toward the solar cell detector of the hit sensor where the laser pulses are received, amplified by the detector amplifier. Now, if the energy of the pulses is above a given threshold which has been set as an indication of the impingement of laser pulses on the reflective desired area of the target, the threshold circuit will activate a hit detector such as a smoke grenade, audio alarm, strobe flash or other audio, visual, or tactile indicator, in order that a hit may be scored.

DETAILED DESCRIPTION OF THE DRAWINGS

Figure 1:
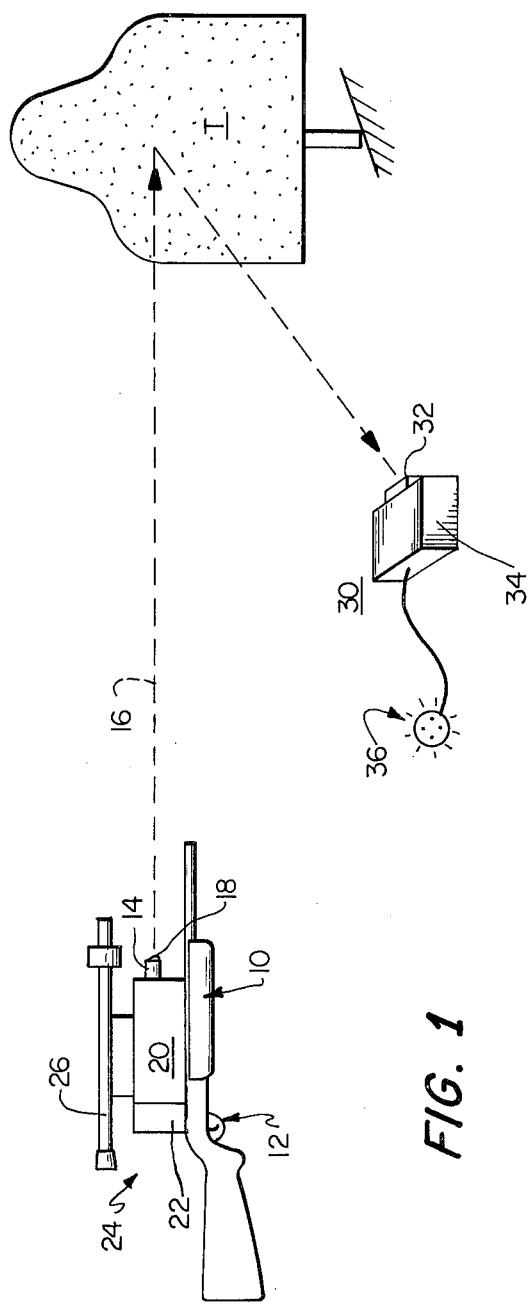
FIG. 1 is a schematic diagram of a weapons gunnery and marksmanship training system of the present invention.

Referring in detail to the drawings and with particular reference to FIG. 1, a rifle or other suitable weapon 10 having a trigger 12 or other suitable activating means is shown mounting a bore-sighted laser 14 emitting a pulse or pulses 16 of the laser energy through a suitable collimating lens 18. The laser 14 is pulsed by a pulser device 20 of a type well known in the art which in turn is energized from a standard type battery pack 22. The entire laser package 24 constituting the elements 14-22 inclusive, is mounted atop the weapon 10 and above that is mounted a telescopic sight 26 or the like which is utilized to aim the weapon 10 and the bore-sighted laser 14 at a target T which is shown down range from the weapon 10.

In the particular embodiment shown in FIG. 1, the distance from the weapon 10 at the firing point to the target T at the aiming point is 300 meters and the laser pulse or pulses 16 are collimated into a beam to a resolution of 3 milliradians by the collimating lens 18. Spaced from the target T and facing the obverse face thereof, which is preferably covered with a reflective material, is a hit detector device 30 which includes a solar cell 32, an amplifier battery pack and detector means 34 and a hit indicator device 36 which is driven by the circuit 34 of the hit detector 30 to provide either an audio alarm or a visible hit indication or both in response to impingement on the target T of the laser pulse or pulses 16.

Figure 2:
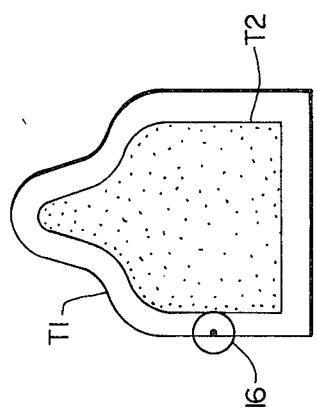
FIG. 2 is an example of a preferred form of silhouette target of the present invention.

Referring to FIG. 2, there is illustrated a silhouette target T-1 which has a smaller target area or aiming point T-2 covered with reflective material as shown by the stippled area T-2 in FIG. 2.

A miss of the preferred area is also shown with the emitted beam of pulses 16 from the laser 14 being impinged upon the border or outer edge of the target T-1 outside of the reflective area or kill point T-2.

As will be hereinafter more fully described, by adjusting the threshold circuit (to be described) which is within the detector circuit 34, the impingement of the emitter beam on the border between the overall target T-1 and the kill point T-2 will not energize the hit indicator, but moving the beam over into the reflective area or kill point T-2 will result in a hit indication.

Figure 3:
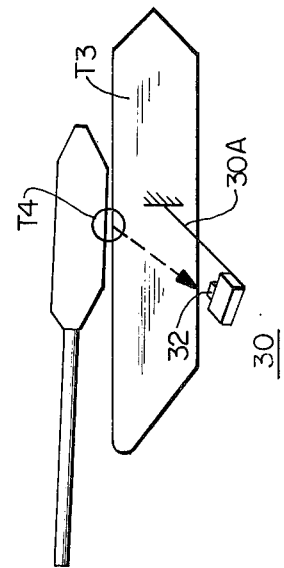
FIG. 3 is a schematic illustration of a kill point type of target of the present invention.

Referring to FIG. 3, a hit detector 30 is shown attached to a large mobile type or large size target T-3 on which is positioned a relatively small kill point T-4 which is covered with reflective material. The detector unit is mounted on a suitable strut or support 30A on the target T-3 such that an impingement of the kill point T-4 by laser energy from the laser 14 of FIG. 1 will result in a hit indication by the hit detector circuit 30.

Figure 4:
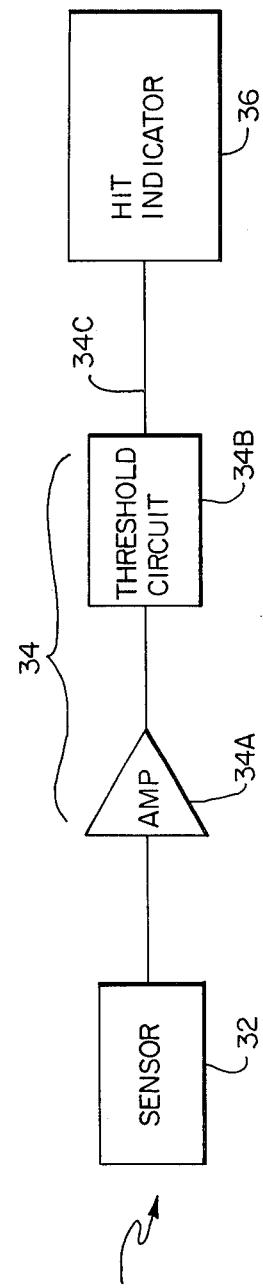
FIG. 4 is a block diagram of a hit detector circuit of the present invention.

Referring to FIG. 4, the hit detector 30 is shown as including the sensor 32 and the detector circuit 34 is shown as including an amplifier 34A and a threshold circuit 34B which drives an output 34C which in turn is connected to the input of a hit indicator 36.

Figure 5:
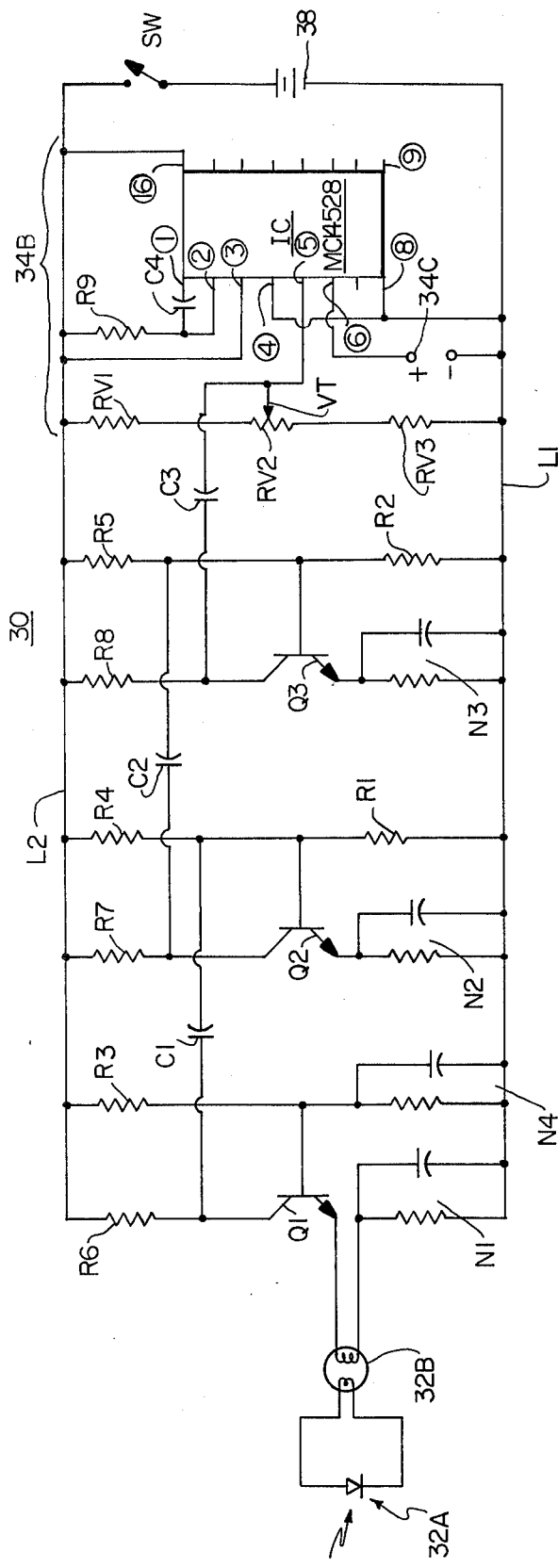
FIG. 5 is a schematic diagram of the hit detector circuit of the present invention.

With reference to FIG. 5, the sensor device 32 is shown as comprising a combined silicon solar cell 32A and a ferrite core transformer 32B.

The secondary winding of the transformer 32B is in series with the emitter circuit of an input transistor Q1 which is in an emitter-follower configuration and together with second and third transistors Q2 and Q3 form a three-stage detector amplifier for amplifying a detection signal resulting from reflected laser energy picked up by the solar cell 32A. By way of example, each of the transistors Q1, Q2 and Q3 are of the 2N706 type.

The emitter of the first transistor Q1 is connected through the secondary winding of the transformer 32B and a parallel RC network N1 to a first common circuit lead L1. The emitters of the said second and third transistors Q2 and Q3 are connected to the first common circuit lead L1 through respective parallel RC networks N2 and N3. The base of the input transistor Q1 is connected to the common circuit lead L1 through a fourth RC parallel network N4 while the bases of the second and third stage transistors Q2 and Q3 are respectively connected to the common circuit lead L1 through first and second resistor means R1 and R2. The bases of the transistor means Q1, Q2 and Q3 are respectively connected to a second common circuit lead L2 through third, fourth and fifth resistor means R3, R4 and R5.

The collectors of the first, second and third stage transistors Q1, Q2 and Q3 are connected to the second common circuit lead L2 through sixth, seventh and eight resistors R6, R7 and R8, respectively. In addition, the collector of the first stage transistor Q1 is connected through a first capacitor C1 to the base of the second stage transistor Q2 while the collector of the second stage transistor Q2 is connected through a second capicitor C2 to the base of the third transistor Q3. The collector of the third stage transistor Q3 is connected through the third capacitor C3 to a variable tap VT on a voltage divider device consisting of the three resistors RV1, RV2 and RV3 connected in series between the common circuit leads L2 and L1. The variable tap VT is also connected to the number 5 terminal pin of an integrated circuit IC of the MC14528 commercial type. The integrated circuit IC together with the voltage divider RV1, RV2, RV2 and the variable tap VT thereon comprises the threshold circuit 34B of the hit detector circuit 30 of the present invention.

Other terminal connections of the integrated circuit IC are as follows:

The number 1 terminal pin is connected through a capacitor C4 and ninth resistor R9 to the second common circuit lead L2;

The number 2 terminal pin is connected through the ninth resistor R9 to the second common circuit lead L2;

The number 3 terminal pin is connected directly to the second common circuit lead L2;

The number 4 terminal pin and the number 8 terminal pin are connected directly to the first common circuit lead L1;

The number 5 terminal pin, as hereinbefore described, is connected directly to the variable tap VT and one side of the capacitor C3;

The number 6 terminal pin of the integrated circuit IC constitutes the positive output terminal 34C of the threshold circuit 34B and the negative output thereof is at the terminal comprising the first common circuit lead L1. The entire circuit is energized by a battery means 38 having its negative terminal coincident with the first common circuit lead L1 and its positive terminal selectively connected directly to the second common circuit lead L2 through an on-off switch SW.

The terminal pin 16 of integrated circuit IC is directly connected to the second common circuit lead L2 to complete the connection of the integrated circuit IC.

In operation, referring jointly to FIGS. 1 and 5, the firearm or gunnery weapon 10 is aimed at the target T, T1 or T3 as the case may be with the telescopic sight 26;

and when the marksmanship trainee utilizing the firearm or weapon 10 feels that the weapon is properly aimed at the target T, the trigger 12 is actuated to cause the laser 14 to emit a pulse or pulses 16 toward the target T.

Now, if the weapon 10 has been properly oriented and the telescopic sight 26 properly placed on the target T in conjunction with the bore-sighted laser 14, then the laser pulse or pulses 16 will strike the target T and be reflected therefrom in the direction of the solar cell 32 on the hit detector circuit device 30. This will cause a current to be induced in the ferrite core transformer 32B and cause the input transistor Q1 to drive the base of the second stage transistor Q2 via the first capacitor C1 and will likewise, via the capacitor C2 cause the third stage transistor Q3 to further amplify the input signal. This transistor Q3, in turn, through the third capacitor C3 will cause a resultant voltage variation about the threshold set by the variable tap VT on the voltage divider RV1, RV2, RV3 in the threshold detector circuit 34B.

This change in voltage at the threshold (which has been set by positioning the variable tap VT at a desired position on the central resistance RV2 in the said voltage divider) will cause the integrated circuit IC to produce an output voltage on the output terminal pin 6 corresponding to the output 34C of the threshold circuit 34B to thereby drive a suitable hit indicator 36 as illustrated in FIG. 4.

By way of example, the solar cell 32A in conjunction with the transformer 32B will cause sufficient energy input to the amplifier 34A to generate an output pulse of a sufficient magnitude to drive a hit detector 36 when the optical power density incident upon the solar cell 32A exceeds 30 nanowatts per square centimeter.

Thus, it can be readily seen from the foregoing specification and drawings that the present invention provides a novel and versatile marksmanship and weapons gunnery training system.

It is to be understood that various modifications can be made to the system of the present invention without departing from the spirit and scope of the appended claims.

What is claimed is:

1. A marksmanship training system comprising:
    weapon means having a bore-sighted laser means thereon for emitting a focussed beam of laser energy to the aiming point of the weapon means in response to selective actuation of the weapon means to simulate firing thereof;
    target means downrange from said weapon means for impingement by said beam in response to correct aiming and simulated firing of said weapon means, said target means including a hit area on the obverse surface covered with a light scattering reflective material, said hit area being a lesser including area of said obverse surface of said target means;
    hit detector means adjacent to said target means responsive to a predetermined level of laser energy reflected therefrom as a result of impingement of said target means by said laser beam for generating an output signal; and
    hit indicator means adjacent said target means actuated by said output signal to provide an indication of said impingement discernible at said firing point, said hit detector and hit indicator means being mounted on said target means adjacent said obverse surface.

2. The invention of claim 1, in which said hit detector means comprises:
    a solar detector means oriented to receive reflected laser energy from said target means and responsive thereto to generate a detection signal;
    amplifier means driven by said detection signal for amplifying same; and
    selectively adjustable threshold circuit means driven by said amplifier means and energized in response to said amplified detection signals in excess of said selected threshold representative of said laser beam impingement on said target means for generating said output signal.

3. The invention of claim 2, wherein said solar detector means comprises:
    a solar cell and a ferrite core transformer having primary and secondary windings;
    said solar cell being connected in series with said primary winding and;
    said secondary winding being connected at the input of said amplifier means.

4. The invention of claim 2, wherein said solar detector means comprises:
    a solar cell and a ferrite core transformer having primary and secondary windings;
    said solar cell being connected is series with said primary winding; and
    said secondary winding being connected at the input of said amplifier means; and further,
    wherein said amplifier means comprises an emitter follower circuit including a first transistor having an emitter terminal in series with said secondary winding for receiving said detection signal; and
    a plurality of amplifier stages driven by said emitter follower circuit for amplifying said detection signal.

* * * * *